(12) United States Patent
Duan et al.

(10) Patent No.: US 7,373,155 B2
(45) Date of Patent: May 13, 2008

(54) METHOD FOR POSITIONING MOBILE STATION AND REPEATER THEREOF

(75) Inventors: Weiming Duan, Shenzhen (CN); Jin Tang, Shenzhen (CN); Huiping Duan, Shenzhen (CN)

(73) Assignee: Huawei Technologies Co., Ltd., Shenzhen, Guangdong Province (CN)

( * ) Notice: Subject to any disclaimer, the term of this patent is extended or adjusted under 35 U.S.C. 154(b) by 179 days.

(21) Appl. No.: 10/531,203

(22) PCT Filed: Aug. 5, 2003

(86) PCT No.: PCT/CN03/00630

§ 371 (c)(1),
(2), (4) Date: Dec. 29, 2005

(87) PCT Pub. No.: WO2004/036938

PCT Pub. Date: Apr. 29, 2004

(65) Prior Publication Data

US 2006/0128399 A1 Jun. 15, 2006

(30) Foreign Application Priority Data

Oct. 15, 2002 (CN) .................... 02 1 44169

(51) Int. Cl.
*H04Q 7/20* (2006.01)
(52) U.S. Cl. .............. 455/456.2; 455/456.5; 455/11.1; 455/422.1; 455/502; 370/350; 370/279
(58) Field of Classification Search ..... 455/456.1–457, 455/404.2, 7, 9, 11.1, 13.1, 18–23, 422.1; 340/425.1, 426.19; 370/226, 241.1, 246, 370/350, 331, 279; 342/15, 353–357.1
See application file for complete search history.

(56) References Cited

U.S. PATENT DOCUMENTS 5,734,982 A * 3/1998 Endo et al. ............... 455/450

(Continued)

FOREIGN PATENT DOCUMENTS

CN          1228908          9/1999

(Continued)

*Primary Examiner*—George Eng
*Assistant Examiner*—Kamran Afshar
(74) *Attorney, Agent, or Firm*—Fish & Richardson P.C.

(57) ABSTRACT

The present invention relates to a method for positioning a mobile station and a repeater thereof. Said method comprises: the mobile communication network, when receiving a positioning request from a mobile station, instructing repeaters to send auxiliary positioning signals, and the mobile station performs measurement according to the received auxiliary positioning signals sent from the repeaters and downlink signals sent from the base station, and then estimating the position of the mobile station according to the measurement results, and thereby implementing the positioning of the mobile station. Said repeater is implemented through adding an auxiliary positioning unit in the downlink processing channel of a traditional repeater; said auxiliary positioning unit comprises a communication module, a frame timing recovery module, a timing control module, and a pilot modulating module. The present invention achieves the object of improving the accuracy of positioning the mobile station within the coverage area of repeaters; in addition, the repeater with auxiliary positioning function according to the present invention is simple to be implemented and doesn't affect the structure and signaling flow of the traditional mobile station.

20 Claims, 4 Drawing Sheets

U.S. PATENT DOCUMENTS

| | | | |
|---|---|---|---|
| 5,937,332 A * | 8/1999 | Karabinis | 455/12.1 |
| 6,275,186 B1 | 8/2001 | Kong | |
| 6,373,833 B1 | 4/2002 | Suonvieri et al. | |
| 6,832,090 B2 * | 12/2004 | Riley et al. | 455/446 |
| 6,873,823 B2 * | 3/2005 | Hasarchi et al. | 455/11.1 |
| 6,987,978 B2 * | 1/2006 | Masuda et al. | 455/456.4 |
| 7,181,171 B2 * | 2/2007 | Forrester | 455/82 |
| 7,283,787 B2 * | 10/2007 | Diao et al. | 455/11.1 |
| 2002/0032031 A1 * | 3/2002 | Ogino et al. | 455/435 |
| 2002/0082050 A1 * | 6/2002 | Mountney et al. | 455/560 |
| 2002/0115448 A1 | 8/2002 | Amerga et al. | |
| 2003/0045230 A1 * | 3/2003 | Weissman | 455/11.1 |
| 2003/0114103 A1 * | 6/2003 | Dinkel et al. | 455/17 |
| 2003/0123401 A1 * | 7/2003 | Dean | 370/318 |
| 2003/0148774 A1 * | 8/2003 | Naghian et al. | 455/456 |
| 2003/0157943 A1 * | 8/2003 | Sabat, Jr. | 455/456 |
| 2003/0190919 A1 * | 10/2003 | Niemenmaa | 455/456.1 |
| 2007/0291668 A1 * | 12/2007 | Duan | 370/280 |

FOREIGN PATENT DOCUMENTS

| | | |
|---|---|---|
| CN | 1290458 | 4/2001 |
| CN | 1413057 | 4/2003 |
| WO | WO 00/65731 | 11/2000 |
| WO | WO 02/17669 | 2/2002 |

* cited by examiner

METHOD FOR POSITIONING MOBILE STATION AND REPEATER THEREOF

FIELD OF THE INVENTION

The present invention relates to the technical field of mobile communication, particularly to a method for positioning a mobile station and a repeater with auxiliary positioning function.

BACKGROUND OF THE INVENTION

To enable the mobile communication network to provide new services, mobile station positioning technique needs to be introduced to determine the position of mobile stations. In a cellular mobile communication network, there are three basic positioning methods: 1) Time Of Arrival (TOA) positioning method, which obtains the distances from a mobile station to the corresponding base stations through measuring TOAs from the mobile station to three or more base stations, and then estimates the position of the mobile station through solving a set of circular equations; 2) Time Difference Of Arrival (TDOA) positioning method, which obtains the differences in distance from a mobile station to the corresponding base stations through measuring TDOAs from the mobile station to three or more base stations, and then estimates the position of the mobile station through solving a set of hyperbolic equations; 3) CELL Identifier (CELL-ID)+TOA positioning method, which firstly determines the position of the serving cell where the mobile station is located with the CELL-IDs configured by the network, and then further determines the position of the mobile station in the cell with the TOA from the mobile station to the serving base station.

However, in traditional mobile communication systems, to ensure normal communication between mobile stations and base stations, repeaters are deployed in some areas that can't be covered by base stations; a repeater is essentially a bidirectional radio frequency signal amplifier, which amplifies and forwards both uplink signals sent from a mobile station and downlink signals sent from a base station; as shown in FIG. 1, in the downlink direction, the donating antenna (antenna of the serving base station) picks up signals from the existing coverage area, filters out-of-band signals through a bandpass filter, amplifies the filtered signals through a power amplifier, and then resends the amplified signals to the area to be covered; in the uplink direction, signals from the mobile station in the coverage area are processed in a similar way and then sent to the corresponding base station; thus, signal transmission between the base station and the mobile station is implemented. The introduction of a repeater implements normal communication between the mobile station in the base station's coverage area and the base station.

The introduction of repeaters results in that the mobile stations in the coverage area of the repeater can't be positioned effectively. When a mobile station required to be positioned is in the coverage area of a repeater, for the TDOA positioning method, the TDOA positioning process will fail because of the number of detectable base stations being too small; even if enough base stations can be detected, there will be very big deviations in the measured values because the signals from the base stations are forwarded by the repeater; as a result, the measured TDOAs can't correctly reflect the differences in distance between different base stations and the mobile; if the measurement result is used for position estimation, there will be a very big deviation in the determined position of the mobile station; furthermore, the positioning system is unable to determine whether the mobile station is within coverage area of the repeater or not and whether the measurement result is affected by the repeater or not. Likewise, when the mobile station requested to be positioned is in coverage of the repeater, for the TOA+CELL-ID positioning method, there will be bigger errors in TOAs due to the time delay effect resulted from the repeater and the TOA positioning accuracy will be degraded severely; as the result, it is unable to positioned the mobile station accurately.

SUMMARY OF THE INVENTION

An object of the present invention is to provide a method for positioning a mobile station and a repeater thereof, to implement accurate positioning of mobile stations within the coverage area of the repeaters and thereby improve the accuracy of positioning mobile stations in the mobile communication network.

The object of the present invention is achieved as follows:
A method for positioning a mobile station, comprising: when receiving a positioning request from a mobile station, the mobile communication network instructing repeaters to send auxiliary positioning signals, and the mobile station measuring the position estimation parameters according to the received auxiliary positioning signals sent from the repeaters and downlink signals sent from the base stations, and then estimating the position of the mobile station according to the measurement results, and thereby determining the position of the mobile station.

Said method for positioning the mobile station further comprises:

a. the mobile communication network, when receiving a positioning request from the mobile station, instructing the serving base station to measure Round Trip Time (RTT) between the serving base station and the mobile station, receiving the measurement result reported from the serving base station, and at the same time sending a measurement control message to the mobile station;

b. determining all repeaters that take the serving base station as a donating base station, configuring auxiliary positioning parameters for the repeaters, and controlling the transmission of auxiliary positioning signals of the repeaters to the mobile station;

c. the mobile station measuring TDOAs between the base stations and the repeaters according to the measurement control message sent from the mobile communication network and the auxiliary positioning signals sent from the repeaters, and reporting the measurement results to the mobile communication network;

d. the mobile communication network estimating the position of the mobile station according to the received RTT between the serving base station and the mobile station as well as TDOAs between the base stations and the repeaters, and thereby determining the position of the mobile station.

Said auxiliary positioning parameter includes: Idle Period DownLink (IPDL) parameter, the scrambling code assigned to a repeater, and the carrier frequency and the transmission power(s) of the auxiliary positioning signals.

Said auxiliary positioning signal is a Primary Common Pilot Channel (P-CPICH) modulated with the scrambling code synchronized with the base station and is sent only during IPDL.

Said measurement control message in step c comprises: information of the serving base station and information of the adjacent base stations; said information of the serving base station comprising the primary scrambling code of the serving base station; said information of an adjacent base station comprises primary scrambling code of the adjacent base station, Relative Time Difference (RTD) between the adjacent base station and the serving base station, and width of the search window.

Said measurement control message also comprises information of repeaters inserted in the information of the adjacent base stations, which comprises: scrambling codes of the repeaters, RTDs between the serving base station and the repeaters, and widths of the search windows.

Said RTDs are determined according to the distances between the repeaters and the serving base station as well as the IPDL parameters, or obtained by measurement using a Location Measurement unit (LMU).

Said scrambling code of a repeater is one of 512 primary scrambling codes and is different from those of adjacent base stations individually.

Said step d comprises:

d1. the mobile communication network searching in the measurement results of TDOA according to the scrambling codes of the repeaters and determining whether the mobile station is within the coverage area of repeaters according to the measurement results; if so, executing step d2; otherwise executing step d3;

d2. correcting the measurement results and estimating the position of the mobile station;

d3. estimating the position of the mobile station directly with the measurement results.

Said step d1 comprises:

d11. the mobile communication network, according to the scrambling codes of the repeaters, determining whether the measurement results of TDOA from the mobile station contain a TDOA, the scrambling code corresponding to which being that of a repeater; if so, executing step d12; otherwise executing step d3;

d12. determining the time delay and coordinate of the repeater according to the obtained scrambling code of the repeater, and working out the distance between the repeater and the serving base station;

d13. determining whether the TDOA corresponding to the repeater is approximately equal to the sum of time delay of the repeater and the time value obtained through dividing the distance between the repeater and the serving base station by the speed of light; if so, executing step d2; otherwise treating the repeater as a pseudo adjacent base station and executing step d3.

Said step d2 comprises:

d21. determining the Time of Arrival (TOA) between the serving base station and the mobile station, the time delays of the repeaters, the distances from the repeaters to the serving base station, the TDOAs between the adjacent base stations and the serving base station, and the TDOAs between the repeaters and the serving base station;

d22. subtracting the TDOAs between the repeaters and the serving base station from the TDOAs between the adjacent base stations and the serving base station to obtain the TDOA between the adjacent base stations and the repeater; subtracting the time value obtained through dividing the distances between the repeaters to the serving base station by the speed of light from the TOA between the serving base station and the mobile station, and subtracting the time delays of the repeaters from the above-obtained results, to obtain TOAs between the mobile station and the repeaters;

d23. determining the position of the mobile station according to the TDOAs between the adjacent base stations and the repeaters as well as the TOAs between the mobile station and the repeaters, in conjunction with the coordinates of the repeaters and the coordinates of the adjacent base stations.

Said adjacent base stations include the repeater that is treated as a pseudo adjacent base station.

A repeater for implementing the function of positioning the mobile station, comprising a downlink processing channel and an uplink processing channel; said downlink processing channel including an added auxiliary positioning unit, which receives downlink signals from the base station and signals carrying auxiliary positioning parameters sent from the mobile communication network, generates and sends auxiliary positioning signals to the mobile station.

Said auxiliary positioning unit comprises:

a communication module, which receives signals carrying auxiliary positioning parameters sent from the mobile communication network;

a frame timing recovery module, which receives downlink signals from the base station, processes the signals to obtain a frame synchronization signal, and sends said frame synchronization signal to a timing control module and a pilot modulating module, respectively;

a timing control module, which receives the frame synchronization signal sent from the frame timing recovery module, generates and sends an pulse sequence to the pilot modulating module;

a pilot modulating module, which receives the frame synchronization signal sent from the frame timing recovery module and the pulse sequence sent from the timing control module, generates and sends auxiliary positioning signals to the mobile station.

Said downlink processing channel comprises a low noise amplifier, a filter, and a power amplifier.

Depending on the actual structure of the repeater, said auxiliary positioning unit also comprises:

a RF processing module, which comprises an automatic gain control sub-module, a RF receiving and filtering sub-module, and a down frequency converter, and outputs RF signals to an intermediate frequency processing module;

an intermediate frequency processing module, which comprises an intermediate frequency filtering sub-module, an analog-digit converting sub-module, and a digital down frequency converter, and receives RF signals sent from the RF processing module, processes the RF signals and generates base-band signals, and sends the base-band signals to the frame timing recovery module.

Said communication module receives auxiliary positioning parameters from the base station through signaling.

Said communication module receives auxiliary positioning parameters via the operation and maintenance terminal of the repeater.

Input signals of said auxiliary positioning unit are directly obtained through coupling with the forwarding antenna.

Input signals of said auxiliary positioning unit are obtained from a node in the downlink processing channel of the repeater.

Output signals of said auxiliary positioning unit are outputted after combining with signals from the repeater at a node in the downlink processing channel of the repeater.

Output signals of said auxiliary positioning unit are sent via a forwarding antenna after combining with signals from the repeater before the power of the downlink processing channel of the repeater is amplified.

It can be seen from the above technical solution that the method for positioning a mobile station and the repeater thereof according to the present invention comprising: firstly, determining whether the mobile station is within the coverage area of a repeater or not; if so, determining the position of the mobile station with the corresponding repeater as the reference point, thus improving the positioning accuracy of the mobile station within the coverage area of the repeater; if not, positioning the mobile station with the existing mobile station positioning method; that is to say, the present invention can determine whether the mobile station is within the coverage area of a repeater according to the measurement results of the mobile station, and if it is, the present invention can determine the specific repeater and correlate the measurement results with the reference point correctly. As a result, the present invention achieves the object of improving the accuracy of positioning the mobile station within the coverage area of a repeater; in addition, the repeater with auxiliary positioning function provided in the present invention is simple to be implemented and doesn't affect the structure and signaling flow of the traditional mobile station.

DETAILED DESCRIPTION OF THE EMBODIMENTS

Figure 2:
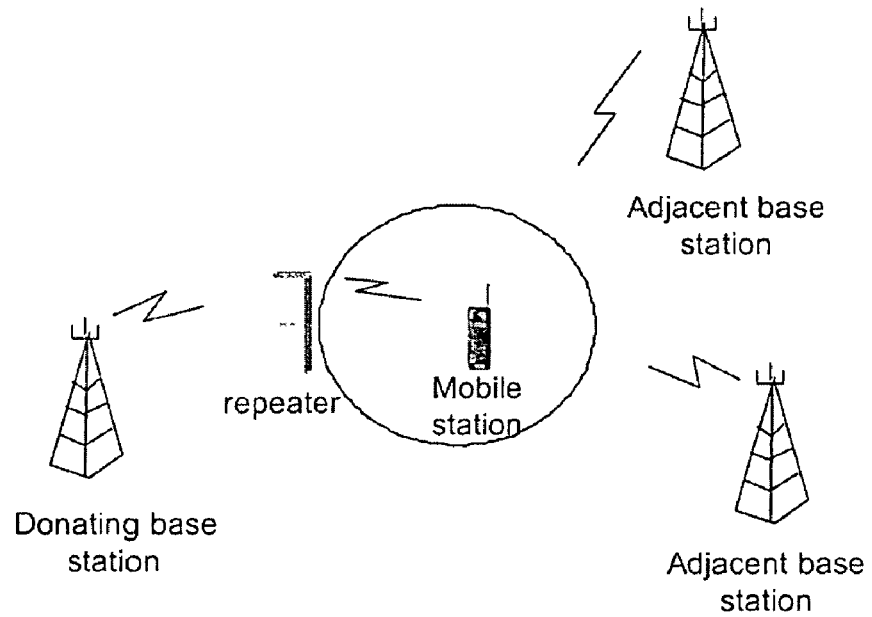
FIG. 2 shows the networking structure of the mobile communication network schematically.
Figure 3:
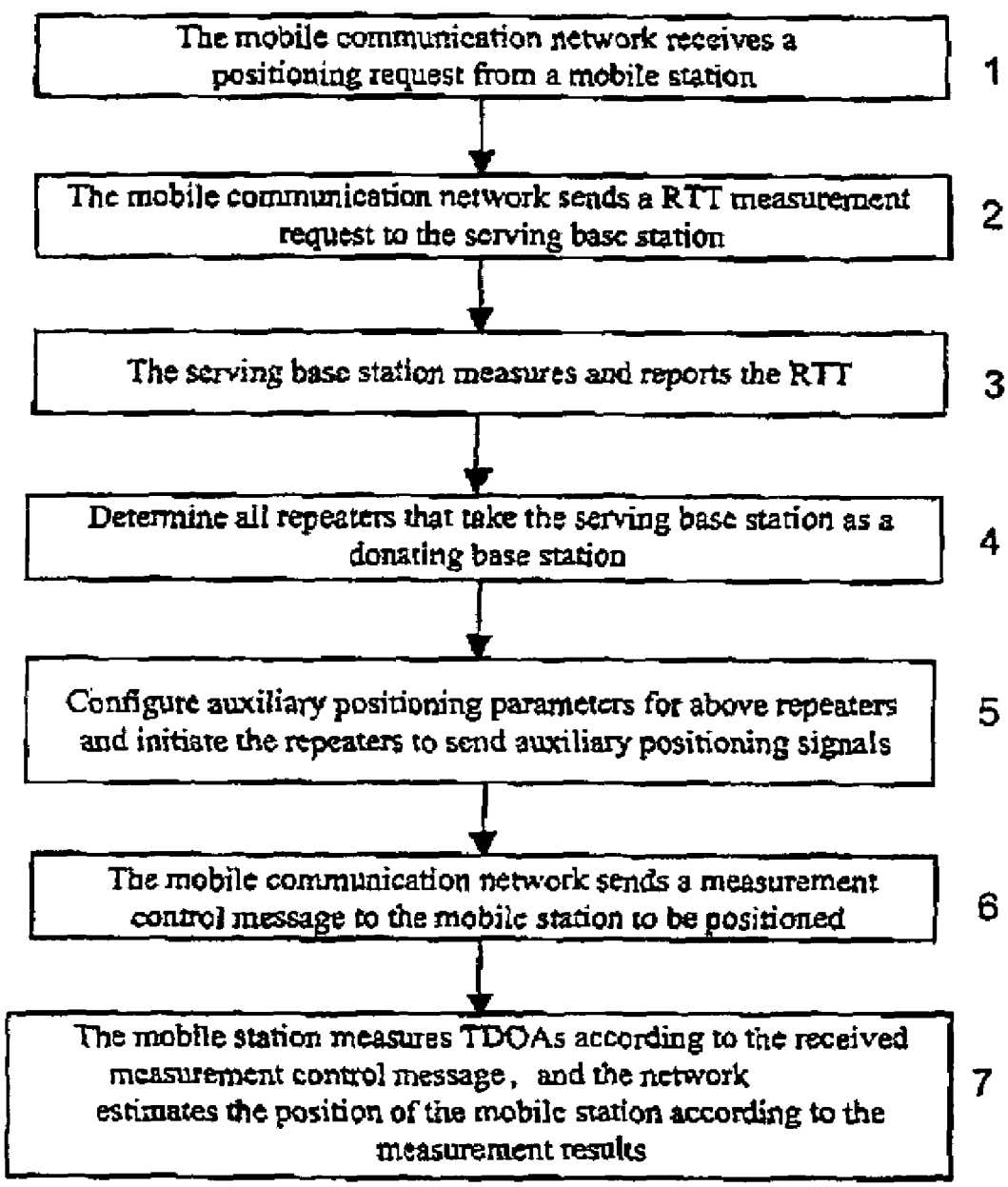
FIG. 3 is an implementing flow chart of the method according to the present invention.

The networking structure of the mobile communication network is as shown in FIG. 2. To improve the accuracy of positioning the mobile station in the mobile communication network that is deployed with repeaters, the present invention provides a method for positioning the mobile station, the detailed embodiment of which is shown in FIG. 3:

Step 1: the mobile communication network receives a positioning request message from the mobile station;

Step 2: the mobile communication network sends a Round Trip Time (RTT) measurement request to the serving base station;

Step 3: the serving base station measures RTT between itself and the mobile station, and reporting the measurement result;

Step 4: searches and determines all repeaters that take the serving base station as a donating base station according to the information from the serving base station serving the mobile station;

Step 5: the mobile communication network configures auxiliary positioning parameters for each of the repeaters determined in step 4 and initiates all of the repeaters to send auxiliary positioning signals;

Said auxiliary positioning parameters including: IPDL x(Idle Period Downlink) parameters, scrambling codes corresponding to the repeaters, and carrier frequency and transmission power(s) of the auxiliary positioning signals;

Configuring the auxiliary positioning parameters for each of the repeaters determined in step 4 maybe implemented through receiving auxiliary positioning parameters from the base stations through signaling, or through receiving auxiliary positioning parameters from the operation and maintenance terminal of the repeater;

Step 6: the mobile communication network sends a measurement control message to the mobile station to be positioned;

Said measurement control messages contains information of the serving cell belonging to the serving base station and information of its adjacent cells; said information of the serving cell comprises primary scrambling code of the serving cell etc.; said information of the adjacent cells comprises primary scrambling codes of the adjacent cells, RTDs between the adjacent cells and the serving cell, and widths of the search windows; the information of all repeaters determined in step 4, which comprises scrambling codes of the repeaters, RTDs between the repeaters and the donating base station, and width of the search window, is also inserted in the information of the adjacent cells and is sent together with the information of the adjacent cells; wherein, the scrambling code of a repeater is one of 512 scrambling codes and is different from the scrambling codes of adjacent base stations; RTDs are determined according to the distances between the repeaters and the serving base station as well as the IPDL parameters, or obtained by measurement using a Location Measurement Unit (LMU);

Step 7: after receiving the measurement control message, the mobile station measures TDOAs, and reporting the measurement results; the mobile communication network estimating the position of the mobile station according to the measurement results and thereby positioning the mobile station.

Figure 4:
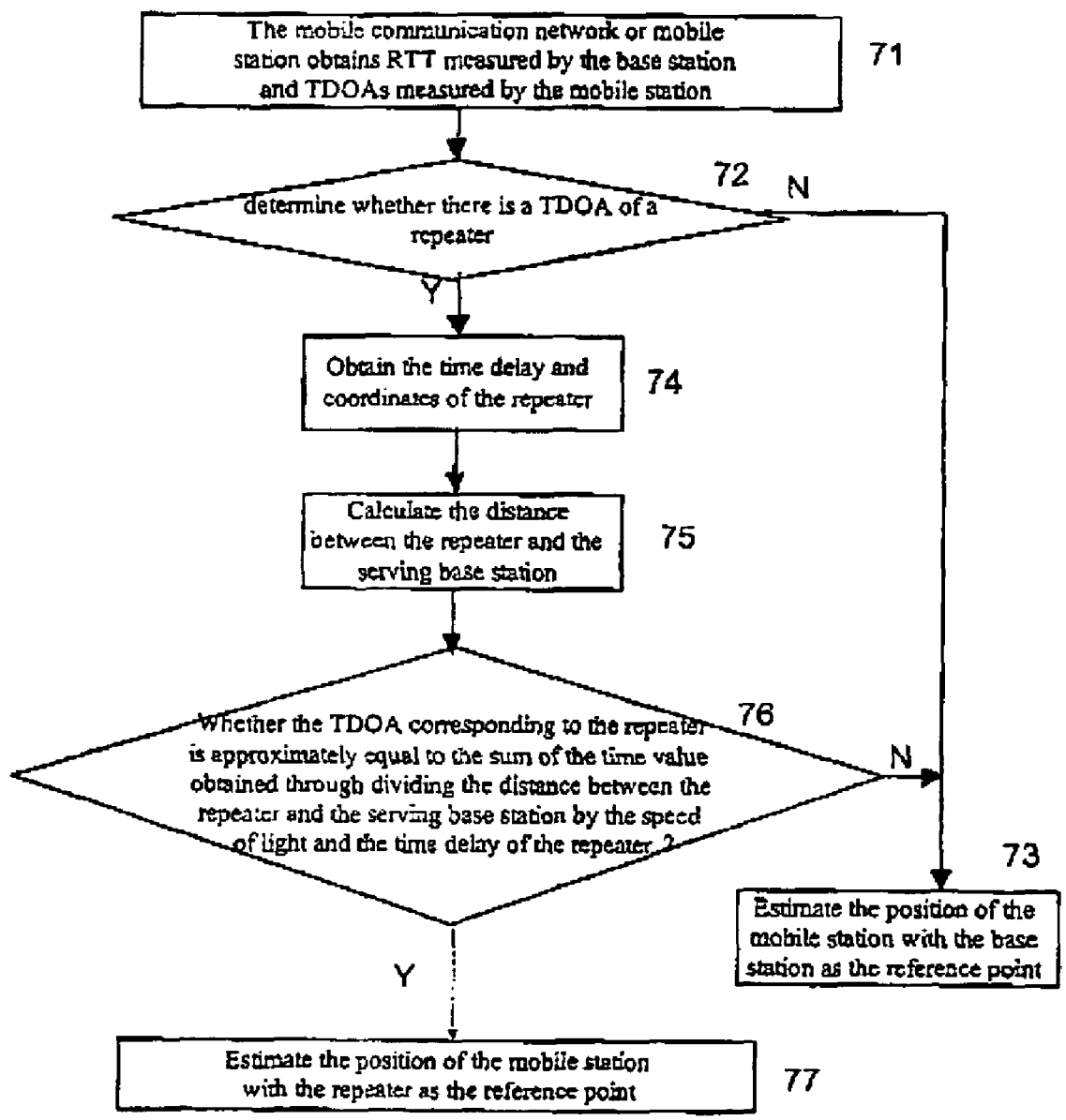
FIG. 4 is a flow chart of estimating position of the mobile station.

The mobile station position estimation process described in step 7 comprises the following steps, as shown in FIG. 4:

Step 71: the mobile communication network obtains the RTT measured by the serving base station and TDOAs measured by the mobile station;

Step 72: searches in TDOAs measured by the mobile station according to the scrambling codes of the repeaters and determines whether there is a TDOA corresponding to the scrambling code of a repeater belonging to the serving cell; if not, executes step 73; otherwise executes step 74;

Step 73: determines the mobile station is not within the coverage area of any repeater, and using traditional method estimating the position of the mobile station directly according to the measured TDOAs and RTT in conjunction with the coordinates of the serving base station and the adjacent base stations, and thereby determines the position of the mobile station;

Step 74: determines the mobile station has received auxiliary positioning signals from a repeater and looks for the time delay T and coordinates of the repeater according to the information of the repeater;

Step 75: calculates the distance D between the repeater and the serving base station according to the coordinates of the repeater and the serving base station;

Step 76: determines whether the TDOA corresponding to the repeater determined in step 72 is approximately equal to D/C+T (i.e., the sum of the time value obtained by dividing the distance between the repeater and the serving base station by the speed of light and the time delay of the repeater) wherein C is the speed of light, to further determine whether the signals, from the serving base station, received by the mobile station has been forwarded by the repeater; if the TDOA is not approximately equal to D/C+T, executing step 77; otherwise executes step 78;

Step 77: determines the signals, from the serving base station, received by the mobile station has not been forwarded by the repeater, then executes step 73;

Though the mobile station has received auxiliary positioning signals from a repeater, the reference point for the positioning mobile station is still the serving base station, and the repeater may be treated as a pseudo adjacent base station; the coordinates of the adjacent base stations used in the position estimation in step 73 include the coordinates of the pseudo adjacent base station, (i.e., coordinates of the repeater), and the TDOAs of adjacent base stations used in the position estimation also include the TDOA of the pseudo adjacent base station, (i.e., TDOA corresponding to the repeater);

Step 78: determines the signals, from the serving base station, received by the mobile station has been forwarded by the repeater, and estimating the position of mobile station with the repeater as the reference point and thereby positioning the mobile station;

The specific positioning method is as follows:

It is supposed that the corresponding TOA is obtained according to the RTT measured by the serving base station, the time delay of the repeater is T, the distance from the repeater to the base station is D, the measurement value of TDOA between the adjacent base station and the serving base station is TDOAi, the TDOA between the repeater and the serving base station is TDOAo, the speed of light is C, then, with the repeater as the reference point, the TDOA between the adjacent base station and the repeater is TDOAi'=TDOAi−TDOAo, the TOA between the mobile station and the repeater is TOA'=TOA−D/C−T;

the position of the mobile station is calculated according to TDOAi' and TOA' in conjunction with the coordinates of the repeater and the adjacent base station and thereby positioning the mobile station.

Thus, accurate positioning of a mobile station in a mobile communication network deployed with repeaters is implemented through the above process.

Figure 1:
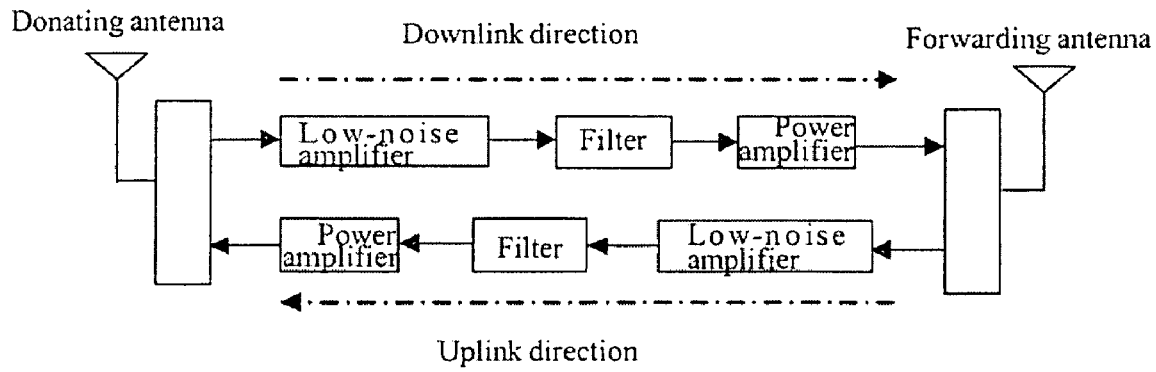
FIG. 1 is the schematic structural diagram of a traditional repeater.

On the basis of the above-mentioned method, the present invention also provides a repeater with auxiliary positioning function, which is implemented through adding an auxiliary positioning unit to the downlink processing channel of a traditional repeater to implement the method for positioning mobile station mentioned above. As shown in FIG. 1, a traditional repeater comprises a donating antenna and a forwarding antenna; in the downlink direction, signals received from the donating base station are processed through a low-noise amplifier, a filter, and a power amplifier, and finally transmitted via the forwarding antenna; the process for uplink signal processing is the same as that for downlink signal processing.

Figure 5:
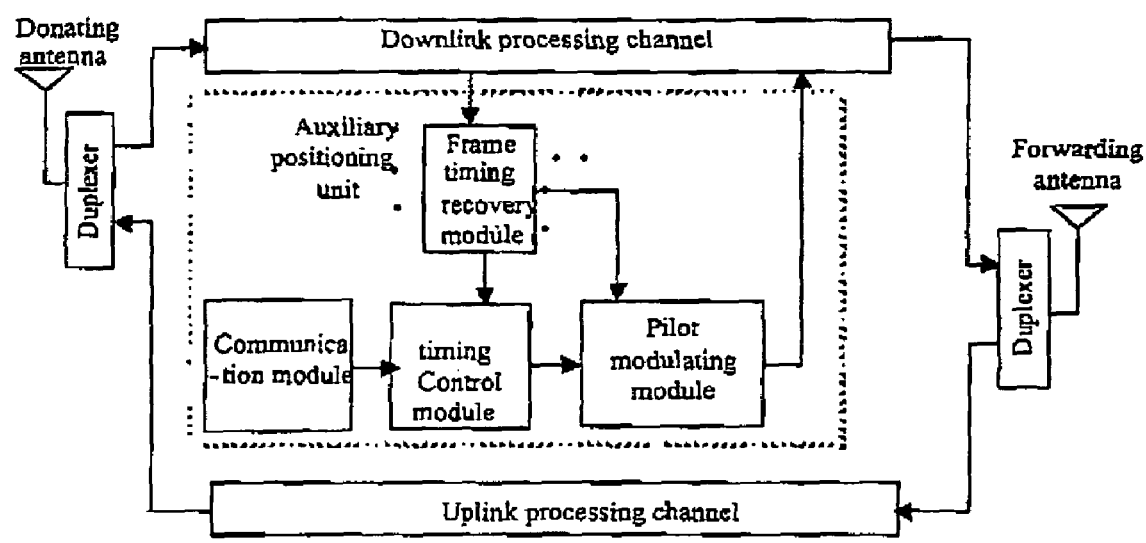
FIG. 5 is a schematic structural diagram of the repeater according to the present invention.

The specific structure of the repeater with auxiliary positioning function described in the present invention is as shown in FIG. 5; an auxiliary positioning unit is added in the downlink direction of the repeater, said auxiliary positioning unit receives downlink signals from the base station and signals carrying auxiliary positioning parameters sent from the mobile communication network, generates auxiliary positioning signals, and sends them to the mobile station; said auxiliary positioning unit mainly comprises a communication module, a frame timing recovery module, a timing control module, and a pilot modulating module; wherein:

the communication module receives signals carrying auxiliary positioning parameters from the mobile communication network; said auxiliary positioning parameters include IPDL parameters, the scrambling codes of repeaters, and carrier frequency and transmission power(s) of the auxiliary positioning signals;

the frame timing recovery module receives downlink signals from the base station, obtains a frame synchronization signal after processing the signals, and sends said frame synchronization signal to the timing control module and the pilot modulating module respectively, to assist to generate scrambling codes and a pulse sequence;

the timing control module receives the frame synchronization signal from the frame timing recovery module, generates a pulse sequence that are used to assist to control the transmission and close of the auxiliary positioning signals according to the IPDL parameters and the frame synchronization signal, and sends it to the pilot modulating module;

the pilot modulating module receives the frame synchronization signal sent from the frame timing recovery module and pulse sequence sent from the timing control module; it firstly generates a scrambling code synchronized with signals from base station according to the frame synchronization signal and the number of scrambling code, and then modulates P-CPICH with the scrambling code to obtain continuous auxiliary positioning signals, then modulates the continuous auxiliary positioning signals with the pulse sequence, and sends it to the mobile station.

The input signals of the auxiliary positioning module may be obtained directly through coupling with the forwarding antenna, and may also be inputted from other nodes in the downlink processing channel of the repeater; the auxiliary positioning signals outputted from the auxiliary positioning module may be combined with downlink signals from the repeater before the power amplification in the downlink processing channel of the repeater and then transmitted together with the downlink signals from the repeater by the forwarding antenna, and may also be combined with signals from the repeater at other nodes and then transmitted.

Depending on different input signals, the auxiliary positioning unit may also comprises a RF processing module or an intermediate frequency processing module required, both of which employ traditional structure; said RF processing module comprises an automatic gain control sub-module, a RF receiving and filtering sub-module, and a down frequency converter, and outputting RF signals to the intermediate frequency processing module; said intermediate frequency processing module comprises an intermediate frequency filtering sub-module, an analog-digit conversion sub-module, and a digital down frequency converter, and is designed to receive RF signals sent from the RF processing module, generates base-band signals, and sends the base-band signals to the frame timing recovery module.

The invention claimed is:

1. A method for positioning a mobile station, comprising:
   a. instructing a serving base station to measure Round Trip Time (RTT) between the serving base station and the mobile station, when a positioning request from the mobile station is received in a mobile communication network, receiving a measurement result reported from the serving base station, and at the same time sending a measurement control message to the mobile station;
   b. determining all repeaters that take the serving base station as a donating base station, configuring auxiliary positioning parameters for the repeaters, and controlling transmission of auxiliary positioning signals from the repeaters to the mobile station;
   c. measuring, in the mobile station, Time Differences of Arrival (TDOAs) between the base stations and the repeaters according to the measurement control message sent from the mobile communication network and the auxiliary positioning signals sent from the repeaters, and reporting TODA measurement results to the mobile communication network; and
   d. determining a position of the mobile station by estimating, in the mobile communication network, the position of the mobile station according to received RTT between the serving base station and the mobile station as well as TODAs between the base stations and the repeaters.

2. The method for positioning a mobile station according to claim 1, wherein said auxiliary positioning parameter includes: Idle Period DownLink (IPDL) parameter, a scrambling code assigned to the repeater, and carrier frequency and transmission power of the auxiliary positioning signals.

3. The method for positioning a mobile station according to claim 1, wherein said auxiliary positioning signal is a Primary Common Pilot Channel (P-CPICH) sent only during IPDL and is modulated with a scrambling code synchronized with the base station.

4. The method for positioning a mobile station according to claim 1, wherein said measurement control message comprises: information of the serving base station and information of an adjacent base station; said information of the serving base station comprising a primary scrambling code of the serving base station; said information of the adjacent base station comprising a primary scrambling code of the adjacent base station, Relative Time Difference (RTD) between the adjacent base station and the serving base station, and a width of a search window.

5. The method for positioning a mobile station according to claim 4, wherein said measurement control message also comprises information of repeaters inserted in the information of the adjacent base station wherein the information of the adjacent base station further comprises: scrambling codes of the repeaters and RTDs between the serving base station and the repeaters.

6. The method for positioning a mobile station according to claim 5, wherein said RTDs between the serving base station and the repeaters are determined according to the distances between the repeaters and the serving base station as well as the IPDL parameter, or obtained by measurement using a Location Measurement Unit (LMU).

7. The method for positioning a mobile station according to claim 4, wherein said scrambling code of a repeater is one of 512 primary scrambling codes and is different from those of adjacent base stations individually.

8. The method for positioning a mobile station according to claim 5, the method further comprising:
(d1) searching in the measurement results of TDOA according to the scrambling codes of the repeaters; determining whether the mobile station is within the coverage area of repeaters according to the TDOA measurement results;
(d2) correcting the TDOA measurement results and estimating the position of the mobile station if the mobile station is within the coverage area of the repeaters; and
(d3) estimating the position of the mobile station directly with the measurement results if the mobile station is not within the coverage area of the repeaters.

9. The method for positioning a mobile station according to claim 8, wherein said process d1 further comprises:
(d11) determining, according to the scrambling codes of the repeaters, whether the TDOA measurement results from the mobile station contain a TDOA, if so, executing process d12; otherwise executing process d3;
(d12) determining a time delay and coordinate of the repeater according to the obtained scrambling code of the repeater, and working out the distance between the repeater and the serving base station; and
(d13) determining whether the TDOA corresponding to the repeater is approximately equal to the sum of time delay of the repeater and the time value obtained through dividing the distance between the repeater and the serving base station by the speed of light; if so, executing process d2; otherwise treating the repeater as a pseudo adjacent base station and executing process d3.

10. The method for positioning a mobile station according to claim 8, wherein said process d2 comprises:
(d21) determining the Time of Arrival (TOA) between the serving base station and the mobile station, the time delays of the repeaters, the distances from the repeaters to the serving base station, the TDOAs between the adjacent base stations and the serving base station, and the TDOAs between the repeaters and the serving base station;
(d22) subtracting the TDOAs between the repeaters and the serving base station from the TDOAs between the adjacent base stations and the serving base station to obtain the TDOA between the adjacent base stations and the repeater; subtracting the time value obtained through dividing the distances between the repeaters to the serving base station by the speed of light from the TOA between the serving base station and the mobile station, and subtracting the time delays of the repeaters from the above-obtained results, to obtain TOAs between the mobile station and the repeaters; and
(d23) determining the position of the mobile station according to the TDOAs between the adjacent base stations and the repeaters as well as the TOAs between the mobile station and the repeaters, in conjunction with the coordinates of the repeaters and the coordinates of the adjacent base stations.

11. The method for positioning a mobile station according to claim 10, wherein said adjacent base stations include a repeater is treated as a pseudo adjacent base station.

12. A repeater for implementing the function of positioning the mobile station, comprising;
a downlink processing channel and an uplink processing channel, wherein said downlink processing channel includes an added auxiliary positioning unit,
a communication module operable to receive signals carrying auxiliary positioning parameters sent from a mobile communication network;
a frame timing recovery module operable to receive downlink signals from a base station, process the signals to obtain a frame synchronization signal, and send said frame synchronization signal to a timing control module and a pilot modulating module, respectively;
the timing control module operable to receive the frame synchronization signal sent from the frame timing recovery module, and generate and send a pulse sequence to the pilot modulating module, wherein
the pilot modulating module, which receives the frame synchronization signal sent from the frame timing recovery module and the pulse sequence sent from the timing control module, is operable to generate and send auxiliary positioning signals to the mobile station.

13. The repeater according to claim 12, wherein said downlink processing channel comprises a low noise amplifier, a filter, and a power amplifier.

14. The repeater according to claim 12, wherein said auxiliary positioning unit, also comprises:
a RF processing module operable to output RF signals to an intermediate frequency processing module comprising an automatic gain control sub-module, a RF receiving and filtering sub-module, and a down frequency converter;

an intermediate frequency processing module comprising an intermediate frequency filtering sub-module, an analog-digit converting sub-module, and a digital down frequency converter wherein the intermediate frequency processing module is operable to receive RF signals sent from the RF processing module, process RF signals, generate base-band signals, and send the base-band signals to the frame timing recovery modules.

15. The repeater according to claim 12, wherein said communication module is operable to receive the auxiliary positioning parameters from the base station through signaling.

16. The repeater according to claim 12, wherein said communication module is operable to receive the auxiliary positioning parameters via the operation and maintenance terminal of the repeater.

17. The repeater according to claim 12, wherein input signals of said auxiliary positioning unit are directly obtained through coupling with the forwarding antenna.

18. The repeater according to claim 12, wherein input signals of said auxiliary positioning unit are obtained from a node in the downlink processing channel of the repeater.

19. The repeater according to claim 12, wherein said auxiliary positioning unit is operable to send output signals after combining with signals from the repeater at a node in the downlink processing channel of the repeater.

20. The repeater according to claim 12, wherein said auxiliary positioning unit is operable to send output signals via a forwarding antenna after combining with signals from the repeater before the power of the downlink processing channel of the repeater is amplified.

* * * * *

US007373155C1

(12) EX PARTE REEXAMINATION CERTIFICATE (8574th)

United States Patent
Duan et al.

(10) Number: US 7,373,155 C1
(45) Certificate Issued: Sep. 27, 2011

(54) METHOD FOR POSITIONING MOBILE STATION AND REPEATER THEREOF

(75) Inventors: Weiming Duan, Shenzhen (CN); Jin Tang, Shenzhen (CN); Huiping Duan, Shenzhen (CN)

(73) Assignee: Huawei Technologies Co., Ltd., Shenzhen (CN)

Reexamination Request:
No. 90/011,447, Feb. 10, 2011

Reexamination Certificate for:
Patent No.: 7,373,155
Issued: May 13, 2008
Appl. No.: 10/531,203
Filed: Dec. 29, 2005

(22) PCT Filed: Aug. 5, 2003
(86) PCT No.: PCT/CN03/00630
§ 371 (c)(1),
(2), (4) Date: Dec. 29, 2005
(87) PCT Pub. No.: WO2004/036938
PCT Pub. Date: Apr. 29, 2004

(30) Foreign Application Priority Data

Oct. 15, 2002 (CN) .......................... 02 1 44169

(51) Int. Cl.
*H04Q 7/20* (2006.01)

(52) U.S. Cl. ............... 455/456.2; 370/279; 370/350; 455/11.1; 455/422.1; 455/456.5; 455/502
(58) Field of Classification Search .............. None
See application file for complete search history.

(56) References Cited

U.S. PATENT DOCUMENTS 5,734,982 A 3/1998 Endo

| | | |
|---|---|---|
| 2001/0012301 A1 | 8/2001 | Yi |
| 2002/0034944 A1 | 3/2002 | Tanno |
| 2002/0077141 A1 | 6/2002 | Hwang |
| 2002/0082050 A1 | 6/2002 | Mountney |
| 2002/0086682 A1 | 7/2002 | Naghian |
| 2003/0008663 A1 | 1/2003 | Stein |
| 2003/0148774 A1 | 8/2003 | Naghian |
| 2003/0157943 A1 | 8/2003 | Sabat |
| 2003/0190919 A1 | 10/2003 | Niemenmaa |

FOREIGN PATENT DOCUMENTS

| WO | WO-01-99444 | 12/2001 |
| WO | WO-02-17669 | 2/2002 |

OTHER PUBLICATIONS

ETSI TS 125 305 V.4.30 (Mar. 2002)—Specification for UE/mobile station location determinations in a cellular network.

*Primary Examiner*—Ovidio Escalante

(57) ABSTRACT

The present invention relates to a method for positioning a mobile station and a repeater thereof. Said method comprises: the mobile communication network, when receiving a positioning request from a mobile station, instructing repeaters to send auxiliary positioning signals, and the mobile station performs measurement according to the received auxiliary positioning signals sent from the repeaters and downlink signals sent from the base station, and then estimating the position of the mobile station according to the measurement results, and thereby implementing the positioning of the mobile station. Said repeater is implemented through adding an auxiliary positioning unit in the downlink processing channel of a traditional repeater; said auxiliary positioning unit comprises a communication module, a frame timing recovery module, a timing control module, and a pilot modulating module. The present invention achieves the object of improving the accuracy of positioning the mobile station within the coverage area of repeaters; in addition, the repeater with auxiliary positioning function according to the present invention is simple to be implemented and doesn't affect the structure and signaling flow of the traditional mobile station.

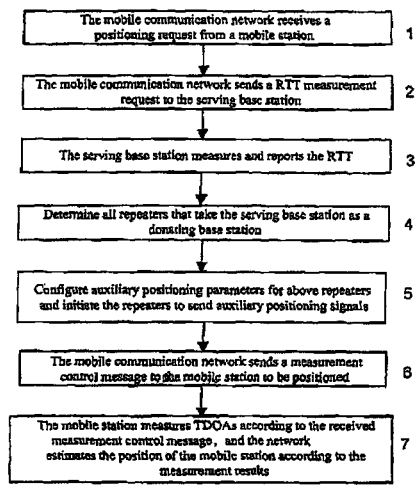

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-20 is confirmed.

\* \* \* \* \*